United States Patent
Seo et al.

(10) Patent No.: US 9,135,891 B2
(45) Date of Patent: Sep. 15, 2015

(54) IMAGE PROJECTION MODULE, MOBILE DEVICE INCLUDING IMAGE PROJECTION MODULE AND METHOD FOR OPERATING THE SAME

(71) Applicant: LG ELECTRONICS INC., Seoul (KR)

(72) Inventors: Junghoon Seo, Seoul (KR); Jaewook Kwon, Seoul (KR); Chanyoung Yoon, Seoul (KR); Yongki Kim, Seoul (KR); Sangkeun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/900,778

(22) Filed: May 23, 2013

(65) Prior Publication Data

US 2013/0335458 A1    Dec. 19, 2013

(30) Foreign Application Priority Data

May 24, 2012    (KR) ........................ 10-2012-0055616

(51) Int. Cl.
```
G09G 5/14      (2006.01)
G02B 27/22     (2006.01)
H04N 13/04     (2006.01)
H04N 9/31      (2006.01)
```

(52) U.S. Cl.
CPC *G09G 5/14* (2013.01); *G02B 27/22* (2013.01); *G02B 27/2207* (2013.01); *H04N 9/3129* (2013.01); *H04N 9/3164* (2013.01); *H04N 9/3182* (2013.01); *H04N 13/0429* (2013.01); *H04N 13/0431* (2013.01); *H04N 13/0459* (2013.01)

(58) Field of Classification Search
CPC ...... G09G 5/14; G02B 27/22; G02B 27/2207; H04N 13/0459; H04N 13/0429; H04N 13/0431; H04N 13/3129; H04N 13/3182; H04N 13/3164
USPC ........................................ 353/7; 345/419, 690
See application file for complete search history.

(56) References Cited

U.S. PATENT DOCUMENTS

| | | | |
|---|---|---|---|
| 2008/0151193 A1 | 6/2008 | Reder | 353/7 |
| 2008/0158672 A1 | 7/2008 | McCosky | 359/464 |

(Continued)

FOREIGN PATENT DOCUMENTS

CN    100350282 C    11/2007

OTHER PUBLICATIONS

European Search Report dated Jan. 22, 2014 issued in Application No. 13 00 2717.
Chinese Office Action dated Nov. 5, 2014 issued in Application No. 201310197096.0.
European Office Action for Application 13 002 717.0 dated Dec. 19, 2014.

*Primary Examiner* — Larry Sternbane
(74) *Attorney, Agent, or Firm* — Ked & Associates LLP

(57) ABSTRACT

An image projection module, a mobile device including the image projection module, and a method for operating the same are disclosed. A method for operating a mobile device including an image projection module includes splitting an input image into a left-eye image and a right-eye image in a three-dimensional (3D) image display mode, driving left-eye and right-eye light sources for outputting light having different wavelengths based on the left-eye image and the right-eye image, synthesizing light output from the left-eye light source and light output from the right-eye light source, and projecting the synthesized light in a first direction and then a second direction. Therefore, it is possible to conveniently display a three-dimensional (3D) image.

20 Claims, 12 Drawing Sheets

(56) References Cited

U.S. PATENT DOCUMENTS

| | | | |
|---|---|---|---|
| 2008/0284982 A1* | 11/2008 | Richards et al. | 352/38 |
| 2009/0079941 A1* | 3/2009 | Miller et al. | 353/8 |
| 2009/0190095 A1* | 7/2009 | Ellinger et al. | 353/7 |
| 2010/0123773 A1 | 5/2010 | Tomita | 348/54 |
| 2011/0063574 A1 | 3/2011 | Freeman | 353/7 |
| 2011/0126160 A1 | 5/2011 | Han et al. | |
| 2013/0182321 A1* | 7/2013 | Silverstein | 359/464 |

\* cited by examiner (a)

(b)

(a)

(b)

IMAGE PROJECTION MODULE, MOBILE DEVICE INCLUDING IMAGE PROJECTION MODULE AND METHOD FOR OPERATING THE SAME

CROSS-REFERENCE TO RELATED APPLICATION

This application claims the priority benefit of Korean Patent Application No. 10-2012-0055616, filed on May 24, 2012 in the Korean Intellectual Property Office, the disclosure of which is incorporated herein by reference.

BACKGROUND OF THE INVENTION

1. Field of the Invention

The present invention relates to an image projection module, a mobile device including the image projection module and a method for operating the same, and more particularly to an image projection module capable of conveniently displaying a three-dimensional (3D) image, a mobile device including the image projection module and a method for operating the same.

2. Description of the Related Art

A mobile device is a portable device having at least one of a function for performing voice and video communication, a function for inputting and outputting information, and a function for storing data. Such a mobile device has complicated functions such as photographing of photos, capturing of moving images, playback of music files or moving image files, reception of games or broadcasts, wireless Internet or message transmission and reception and has been implemented as a multimedia player, as the functions thereof have been diversified.

SUMMARY OF THE INVENTION

Therefore, the present invention has been made in view of the above problems, and it is an object of the present invention to provide an image projection module capable of conveniently displaying a three-dimensional (3D) image, a mobile device including the image projection module and a method for operating the same.

In accordance with an aspect of the present invention, the above and other objects can be accomplished by the provision of a method for operating a mobile device including an image projection module including splitting an input image into a left-eye image and a right-eye image in a three-dimensional (3D) image display mode, driving left-eye and right-eye light sources for outputting light having different wavelengths based on the left-eye image and the right-eye image, synthesizing light output from the left-eye light source and light output from the right-eye light source, and projecting the synthesized light in a first direction and then a second direction.

In accordance with another aspect of the present invention, there is provided an image projection module including left-eye and right-eye light sources configured to output light having different wavelengths, a photosynthetic unit configured to synthesize light output from the left-eye light source and light output from the right-eye light source, and a scanner configured to project the synthesized light in a first direction and then a second direction.

In accordance with a further aspect of the present invention, there is provided a mobile device including a controller configured to split an input image into a left-eye image and a right-eye image and to output the left-eye image and the right-eye image, and an image projection module including left-eye and right-eye light sources configured to output light having different wavelengths, a photosynthetic unit configured to synthesize light output from the left-eye light source and light output from the right-eye light source and a scanner configured to project the synthesized light in a first direction and then a second direction.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

A mobile device described in the present specification includes a mobile phone, a smart phone, a laptop, a digital broadcast terminal, a personal digital assistant (PDA), a portable multimedia player (PMP), a camera, a navigation system, a tablet computer, an e-book terminal, etc.

The terms "module" and "unit" attached to describe the names of components are used herein to aid in the understanding of the components and thus should not be considered as having specific meanings or roles. Accordingly, the terms "module" and "unit" may be used interchangeably.

Figure 1:
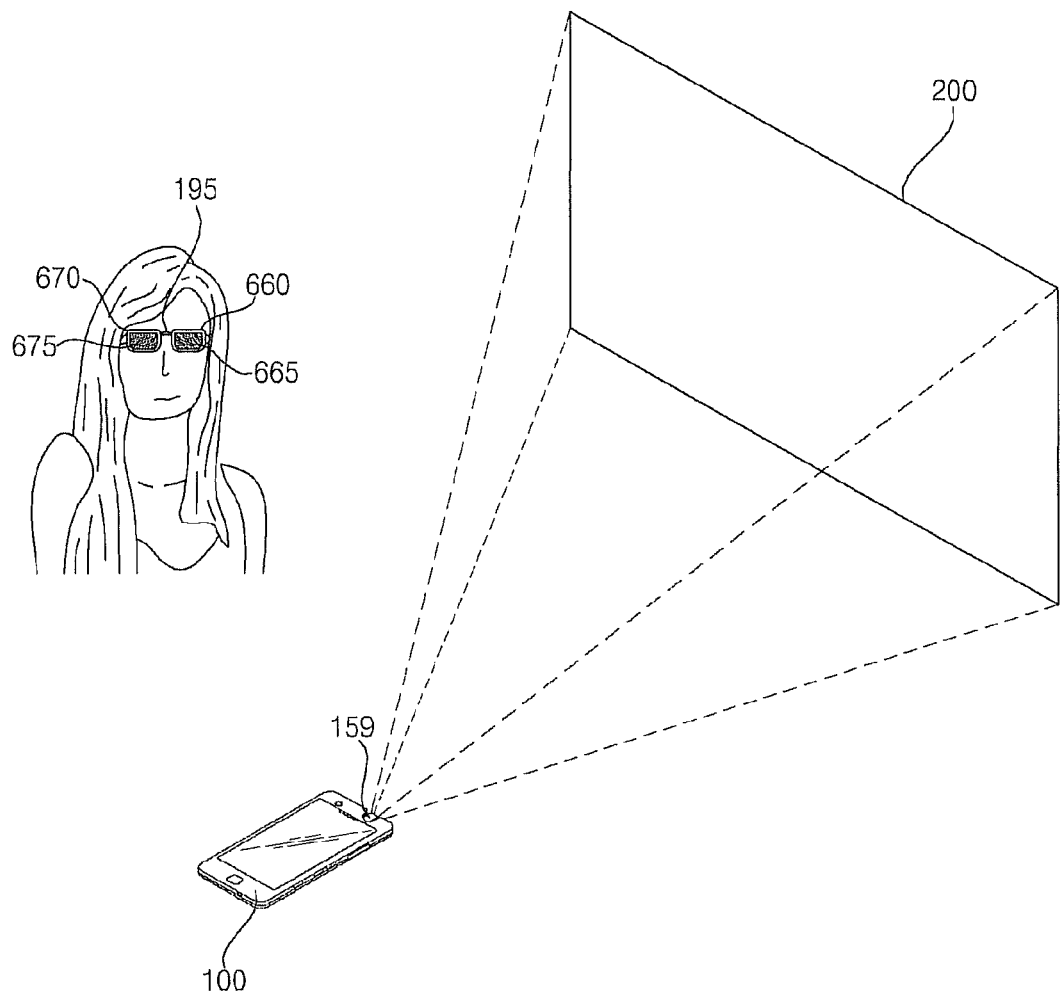
FIG. 1 is a diagram showing image projection of a mobile device including an image projection module according to an embodiment of the present invention.

FIG. 1 is a diagram showing image projection of a mobile device including an image projection module according to an embodiment of the present invention. The mobile device 100 including the image projection module according to the embodiment of the present invention may output a projected image. Although the mobile device 100 is shown as a mobile phone in the figure, various examples may be used as described above. Hereinafter, assume that the mobile device 100 is a mobile phone.

The mobile device 100 includes the image projection module 159 which outputs a projected image in an image projection mode. The projected image may be projected onto a screen 200 such that a user views the projected image.

In a 3D image display mode, the image projection module 159 of the mobile device 100 drives left-eye and right-eye light sources for outputting light having different wavelengths based on a left-eye image and a right-eye image, synthesizes light output from the left-eye light source and light output from the right-eye light source, and projects the synthesized light in a horizontal direction and a vertical direction.

Here, the left-eye and right-eye light sources may include left-eye and right-eye laser light sources, respectively. Or the left-eye and right-eye light sources may include left-eye and right-eye LED light sources, respectively. Hereinafter, the left-eye and right-eye light sources may be described as left-eye and right-eye laser light sources.

The user may wear a 3D viewing device 195 for viewing a projected 3D image. The 3D viewing device 195 includes a left-eye glass 660 and a right-eye glass 670. In addition, the 3D viewing device 195 may further include a left-eye filter 665 for filtering light having a wavelength output from the left-eye light source of the image projection module 159 and a right-eye filter 675 for filtering light having a wavelength output from the right-eye light source of the image projection module 159.

Since the wavelengths of the projected left-eye and right-eye images are different and the wavelength bands of the left-eye filter 665 and the right-eye filter 675 of the 3D viewing device 195 are separated from each other, crosstalk is not generated when the user views a 3D image.

In a 2D image display mode, the image projection module 159 of the mobile device 100 drives the left-eye light source and the right-eye light source based on the same 2D image. Therefore, a 2D image having luminance substantially similar to that of a 3D image is projected.

The image projection module 159 of the mobile device 100 of FIG. 1 will be described in detail with respect to the following figures.

Figure 2:
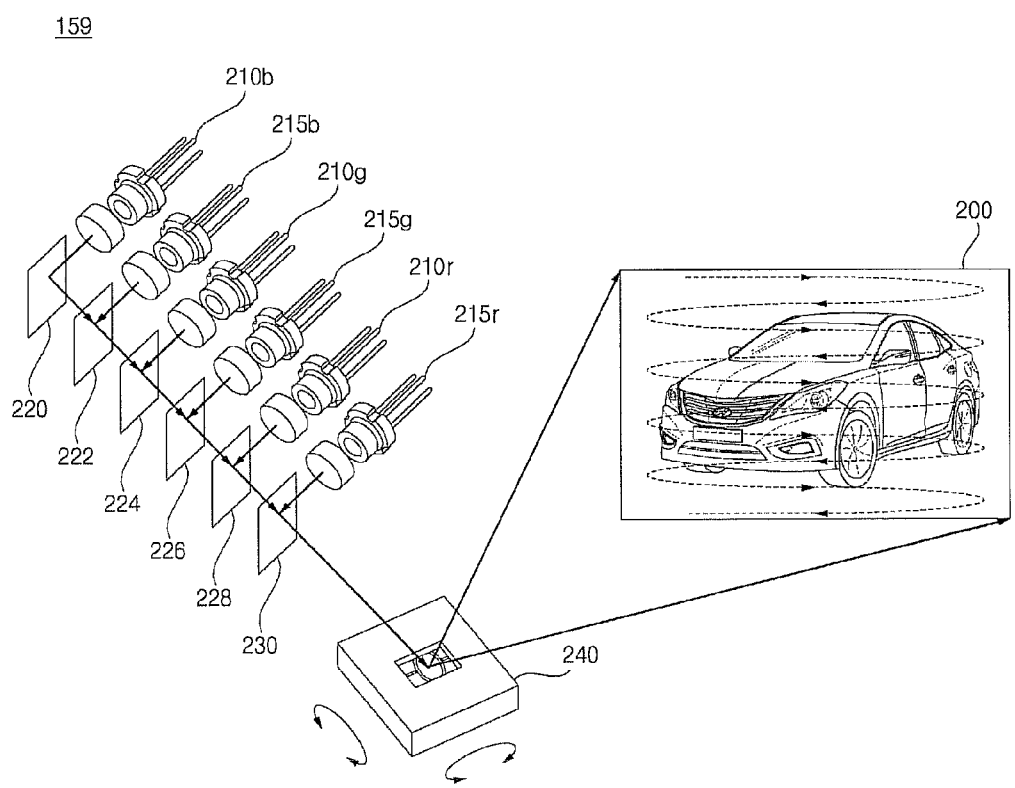
FIG. 2 is a schematic diagram showing the internal structure of the image projection module of the mobile device of FIG. 1.
Figure 3:
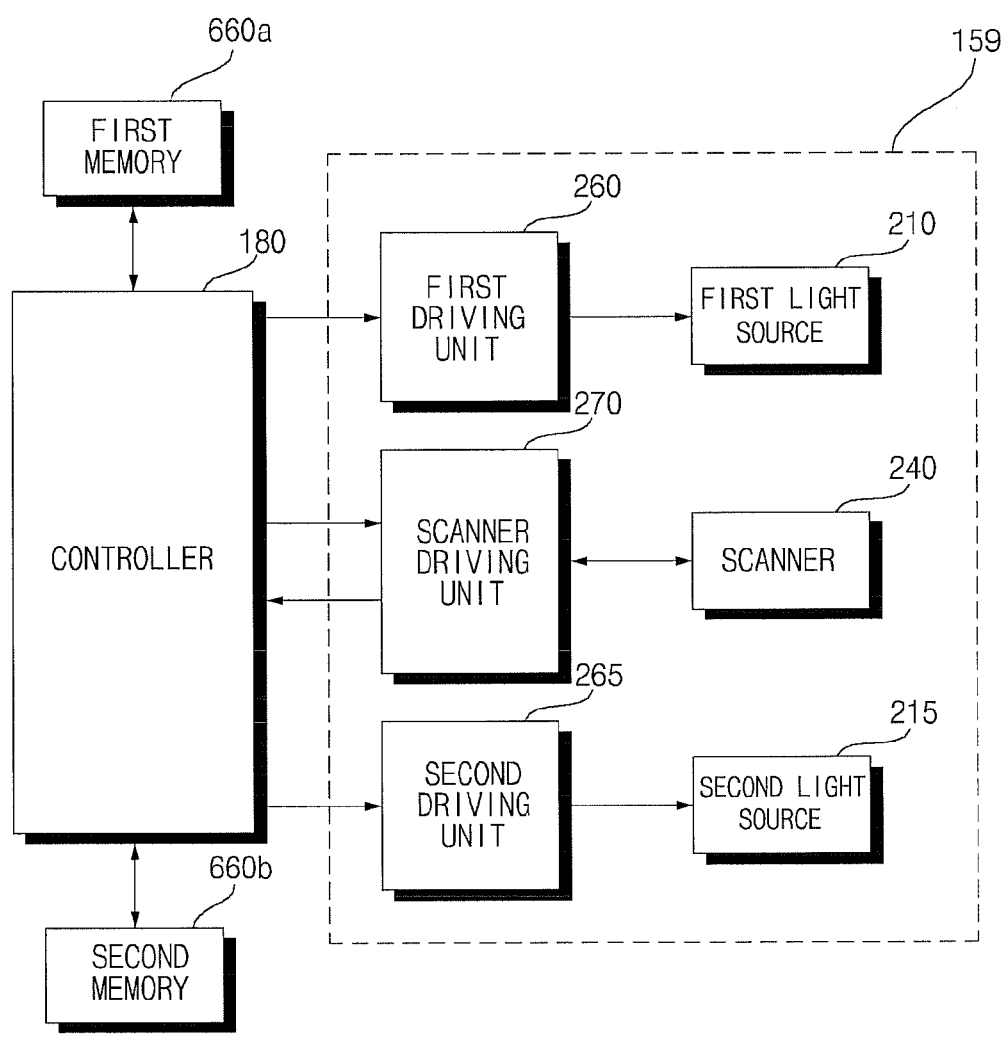
FIG. 3 is a block diagram showing the internal configuration of the image projection module of the mobile device of FIG. 1.
Figure 4:
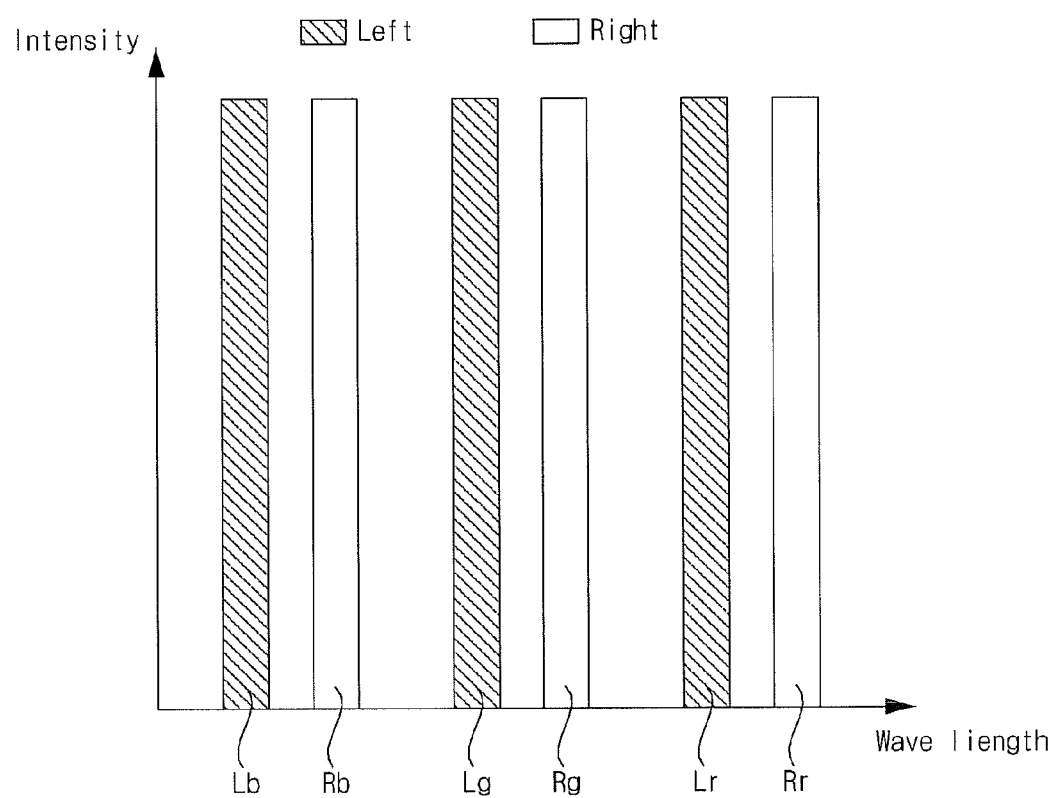
FIG. 4 is a diagram showing the wavelength of light output from a left-eye light source and a right-eye light source of the image projection module of FIG. 1.

FIG. 2 is a schematic diagram showing the internal structure of the image projection module of the mobile device of FIG. 1, FIG. 3 is a block diagram showing the internal configuration of the image projection module of the mobile device of FIG. 1, and FIG. 4 is a diagram showing the wavelength of light output from a left-eye light source and a right-eye light source of the image projection module of FIG. 1.

As shown, the image projection module 159 may include a first light source 210, a second light source 215, a scanner 240, a first driving unit 260, a second driving unit 265, a scanner driving unit 270 and photosynthetic units 220, 222, 224, 226, 228 and 230.

The first light source 210 is a left-eye light source and may include a blue laser diode 210*b* for outputting blue light, a green laser diode 210*g* for outputting green light and a red laser diode 210*r* for outputting red light.

In FIG. 2, the blue laser diode 210*b* having a short wavelength is provided at a location farthest from the scanner 240 and the green laser diode 210*g* and the red laser diode 210*r* are sequentially provided.

The second light source 215 may include a blue laser diode 215*b* for blue light, a green laser diode 215*g* for outputting green light and a red laser diode 215*r* for outputting red light.

In FIG. 2, the blue laser diode 215*b* having a short wavelength is provided at a location farthest from the scanner 240 and the green laser diode 215*g* and the red laser diode 215*r* are sequentially provided. The left-eye laser diodes 210*b*, 210*g* and 210*r* are provided at locations farther from the scanner 240 than the right-eye laser diodes 215*b*, 215*g* and 215*r*.

In the embodiment of the present invention, in order to reduce crosstalk upon 3D image viewing, the laser diodes are spaced apart from each other and output light having different wavelengths.

That is, as shown in FIG. 4, the left-eye light source 210 outputs blue light Lb, green light Lg and red light Lr and the right-eye light source 215 outputs blue light Rb, green light Rg and red light Rr.

The left-eye blue light Lb and the right-eye blue light Rb have different wavelength bands and do not overlap each other. For example, the wavelength band of left-eye blue light Lb may be 443 to 453 nm and the wavelength band of the right-eye blue light Rb may be 468 to 478 nm.

Similarly, the left-eye green light Lg and the right-eye blue light Rg have different wavelength bands and do not overlap each other. For example, the wavelength band of left-eye green light Lg may be 505 to 515 nm and the wavelength band of the right-eye green light Rg may be 520 to 535 nm.

Similarly, the left-eye red light Lr and the right-eye red light Rr have different wavelength bands and do not overlap each other. For example, the wavelength band of left-eye red light Lr may be 632 to 642 nm and the wavelength band of the right-eye red light Rr may be 655 to 665 nm.

Although the wavelengths of the blue light Lb, the green light Lg and the red light Lr output from the left-eye light source 210 are shorter than those of the blue light Rb, the green light Rg and the red light Rr output from the right-eye light source 215 in FIG. 4, the wavelengths of the blue light Lb, the green light Lg and the red light Lr output from the left-eye light source 210 may be longer than those of the blue light Rb, the green light Rg and the red light Rr output from the right-eye light source 215. Hereinafter, assume that the wavelength of the light output from the left-eye light source 210 is shorter than that of the light output from the right-eye light source 215.

Meanwhile, each of the photosynthesizing units 220, 222, 224, 226, 228 and 230 synthesizes the light output from the laser diodes and outputs the synthesized light in one direction. The photosynthesizing units 220, 222, 224, 226, 228 and 230 may be implemented by a 2D MEMS (micro electro mechanical systems) mirror.

That is, the first photosynthesizing unit 220 receives the blue light output from the left-eye blue laser diode 210*b*, changes a light travel direction, and outputs the left-eye blue light toward the scanner 240.

Next, the second photosynthesizing unit 222 receives the blue light output from the right-eye blue laser diode 215*b*, changes a light travel direction thereof, and outputs the right-eye blue light toward the scanner 240. The second photosynthesizing unit 222 outputs the left-eye blue light from the first photosynthesizing unit 220 toward the scanner 240.

In this way, each of the third to sixth photosynthesizing units 224, 226, 228 and 230 output respective light toward the scanner 240.

Next, the scanner 240 receives the light synthesized by the photosynthesizing units and projects the light in a first direction and a second direction. For example, the scanner 240 projects the synthesized light in the horizontal direction with respect to a first line (horizontal scanning, specially right direction scanning), vertically moves to a second line located under the first line (vertical scanning), and projects the synthesized light in the horizontal direction with respect to the second line (horizontal scanning, specially left direction scanning). In this way, the scanner 240 may project the image to be displayed onto the entire region of the screen 200. In FIG. 2, a 2D image 200 is shown as an image projected by the image projection module 159.

The scanner 240 according to the embodiment of the present invention is a 2D scanner capable of performing both first directional scanning and second directional scanning.

Here, the first directional scanning may mean horizontal scanning and the second directional scanning may mean vertical scanning. Or the first directional scanning may mean to right direction scanning and the second directional scanning may mean left direction scanning. Since a plurality of scanners is not required, it is possible to reduce the size of the image projection module. In addition, it is possible to reduce manufacturing costs.

The first driving unit 260 is a left-eye laser driving unit which may drive the left-eye light source 210.

For example, the first driving unit 260 may split the image data output from the controller 180 of the mobile device 100 into a plurality of pieces of color data such as blue, green and red data and output a signal having a level corresponding to each color data to each left-eye laser diode 210b, 210g or 210r.

As another example, the first driving unit 260 may directly receive a plurality of pieces of color data such as blue, green and red data from the controller 180 of the mobile device 100 and output a signal having a level corresponding to each color data to each left-eye laser diode 210b, 210g or 210r.

Next, the second driving unit 265 is a right-eye laser driving unit which may drive the right-eye light source 215.

For example, the second driving unit 265 may split the image data output from the controller 180 of the mobile device 100 into a plurality of pieces of color data such as blue, green and red data and output a signal having a level corresponding to each color data to each right-eye laser diode 215b, 215g or 215r.

As another example, the second driving unit 265 may directly receive a plurality of pieces of color data such as blue, green and red data from the controller 180 of the mobile device 100 and output a signal having a level corresponding to each color data to each right-eye laser diode 215b, 215g or 215r.

The scanner driving unit 270 may control horizontal scanning and vertical scanning of the scanner 240. The scanner driving unit 270 may generate a feedback signal for horizontal scanning and a feedback signal for vertical scanning and send the feedback signals to the controller 180 of the mobile device 100. The controller 180 of the mobile device 100 may control the scanner driving unit 270 based on such feedback signals so as to prevent errors from being generated upon scanning of the scanner 240.

The controller 180 of the mobile device 100 may output left-eye image data and the right-eye image data in a 3D display mode. The left-eye image data may be output to the first driving unit 260 and the right-eye image data may be output to the second driving unit 265.

Alternatively, the controller 180 of the mobile device 100 may output the blue, green and red data for the left-eye image to the first driving unit 260 and output the blue, green and red data for the right-eye image to the second driving unit 265, in a 3D display mode.

The controller 180 of the mobile device 100 may convert a received 2D image into a 3D image in a 3D display mode.

In a 2D display mode, the controller 180 of the mobile device 100 may output the same 2D image data to the first driving unit 260 and the second driving unit 265.

Alternatively, the controller 180 of the mobile device 100 may output the same blue, green and red data to the first driving unit 260 and the second driving unit 265, in a 2D display mode.

The first memory 660a and the second memory 660b may store left-eye image data and right-eye image data in a 3D display mode or may store the same image data in a 2D display mode.

Although the first memory 660a, the second memory 660b and the controller 180 are shown as being provided outside the image projection module 159, that is, inside the mobile device 100 in FIG. 3, the first memory 660a, the second memory 660b and the controller 180 may be included in the image projection module 159. The controller included in the image projection module 159 may perform a function excluding operation associated with the mobile device among the above-described functions of the controller 180.

Figure 5:
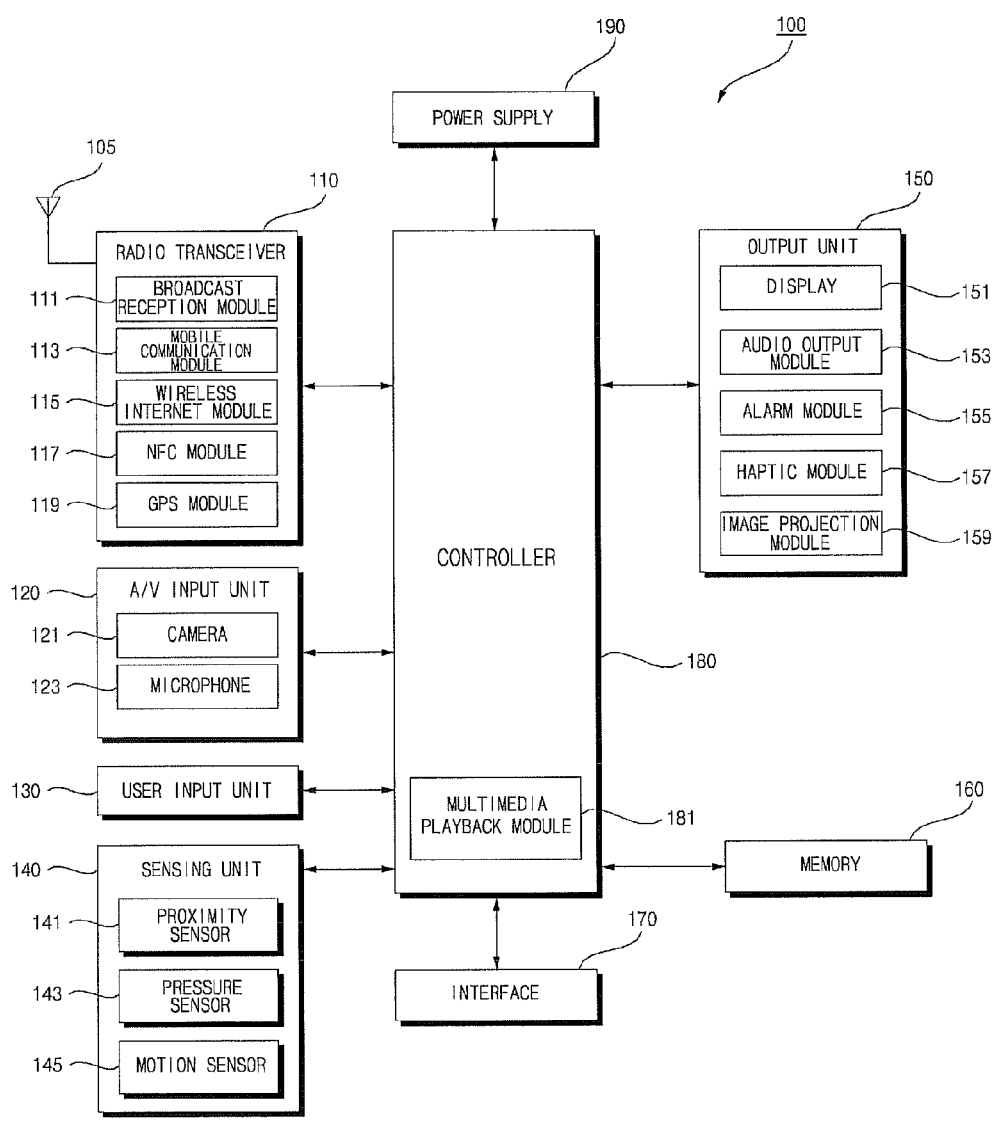
FIG. 5 is a block diagram showing the internal configuration of the mobile device of FIG. 1.

FIG. 5 is a block diagram showing the internal configuration of the mobile device of FIG. 1.

Referring to FIG. 5, the mobile device 100 may include a radio transceiver 110, an audio/video (A/V) input unit 120, a user input unit 130, a sensing unit 140, an output unit 150, a memory 160, an interface 170, a controller 180 and a power supply 190.

The radio transceiver 110 may include a broadcast reception module 111, a mobile communication module 113, a wireless Internet module 115, a near field communication (NFC) module 117, a global positioning system (GPS) module 119, etc.

The broadcast reception module 111 may receive at least one of a broadcast signal and broadcast-related information from an external broadcast management server through a broadcast channel. The broadcast channel may include a satellite channel and a terrestrial channel.

The broadcast signal and/or the broadcast-related information received through the broadcast reception module 111 may be stored in the memory 160.

The mobile communication module 113 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 115 is an internal or external module for wireless Internet access which may be provided to the mobile device 100.

The NFC module 117 may perform NFC. The NFC module 117 may receive information related to content from a media card 50 if the media card 50 approaches within a predetermined distance, that is, upon tagging, which will be described with reference to FIG. 4.

As short-range wireless communication technology, Bluetooth, Radio-Frequency IDentification (RFID), Infrared Data Association (IrDA), Ultra WideBand (UWB), and ZigBee may be used.

The GPS module 119 may receive position information from a plurality of GPS satellites.

The A/V input unit 120 receives an audio signal or a video signal and may include a camera 121 and a microphone 123.

The user input unit 130 generates key input data enabling the user to control the operation of the mobile device. The user input unit 130 may include a keypad, a dome switch, a touchpad (static pressure/static electrical), etc. In particular, if the touchpad and the display 151 have a layered structure, this may be called a touchscreen.

The sensing unit 140 detects a current state of the mobile device 100 such as whether the mobile device 100 is opened or closed, the position of the mobile device 100 and contact/non-contact of a user and generates a sensing signal for controlling the operation of the mobile device 100.

The sensing unit 140 may include a proximity sensor 141, a pressure sensor 143 and a motion sensor 145. The motion sensor 145 may sense motion or position of the mobile device 100 using an acceleration sensor, a gyroscopic sensor and a gravity sensor. In particular, the gyroscopic sensor measures an angular speed and senses a direction (angle) in which the mobile device rotates from a reference direction.

The output unit 150 may include a display 151, an audio output module 153, an alarm unit 155, a haptic module 157 and an image projection module 159.

The display 151 displays information processed by the mobile device 100.

As described above, if the display 151 and the touchpad have the layered structure to configure the touchscreen, the display 151 can be used not only as an output device but also as an input device for inputting information via user touch.

The audio output module 153 may output audio data received from the radio transceiver 110 or stored in the memory 160. The audio output module 153 may include a speaker, a buzzer, etc.

The alarm unit 155 outputs a signal notifying the user that an event has occurred in the mobile device 100. For example, the alarm unit 155 may output a signal in the form of vibrations.

The haptic module 157 generates a variety of tactile effects that the user can feel. A typical example of the tactile effect generated by the haptic module 157 is vibration.

The image projection module 159 projects a 3D image or a second image as described above. In particular, the image projection module 159 includes the left-eye light source 210 and right-eye light source 215 for outputting light having different wavelengths so as to project light having wavelengths which do not overlap each other.

For example, in a 3D display mode, the image projection module 159 may externally project a left-eye image and a right-eye image. In particular, by performing horizontal scanning and vertical scanning using the 2D scanner 240, it is possible to simultaneously project the left-eye image and the right-eye image.

As another example, in a 2D display mode, the image projection module 159 may externally project the same 2D image. In particular, the same 2D image may be externally projected using both the left-eye light source 210 and the right-eye light source 215. Therefore, it is possible to project a 2D image having luminance substantially similar to that of a 3D image.

The memory 160 may store a program for processing and control of the controller 180 and may temporarily store input or output data (for example, a phonebook, messages, audio, still images, and moving images).

The interface 170 serves as an interface with all external devices connected to the mobile device 100. The interface 170 may receive data from an external device or receive power and transmit power to the components of the mobile device 100 or transmit data of the mobile device 100 to an external device.

The controller 180 controls the overall operation of the mobile terminal 100. For example, the controller 180 performs control and processing associated with voice communication, data communication, video communication, and the like. The controller 180 may include a multimedia playback module 181 for multimedia playback. The multimedia playback module 181 may be implemented in the controller 180 in hardware form or may be implemented in software form separately from the controller 180. The operation of the controller 180 for multimedia playback will be described below with reference to FIG. 6.

The power supply 190 receives external power or internal power and supplies power required for operation to each component under control of the controller 180.

The mobile device 100 having the above-described configuration may be configured to include a wired/wireless communication system and a satellite based communication system so as to operate in a communication system capable of transmitting data via a frame or packet.

The block diagram of the mobile device 100 shown in FIG. 5 is only exemplary. Depending upon the specifications of the mobile device 100 in actual implementation, the components of the mobile device 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Figure 6:
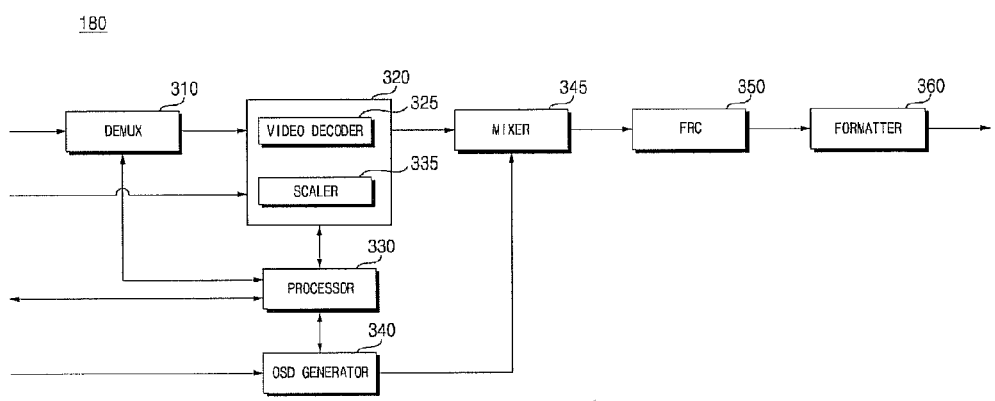
FIG. 6 is a block diagram showing the internal configuration of a controller of FIG. 5.

FIG. 6 is a block diagram showing the internal configuration of a controller of FIG. 5.

Referring to FIG. 6, the controller 180 according to the embodiment of the present invention may include a demultiplexer (DEMUX) 310, a video processor 320, a processor 330, an OSD generator 340, a mixer 345, a frame rate converter (FRC) 350 and a formatter 360. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the broadcast reception module 111, the wireless Internet module 115 or the interface 170.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the image projection module 159 or the display 151.

The video decoder 325 may be provided with decoders that operate based on various standards.

The processor 330 may control overall operation of the mobile device 100 or the controller 180. For example, the processor 330 may control the broadcast reception module 111 to tune to an RF broadcast corresponding to a channel selected by the user or a previously stored channel.

The processor 330 may control the mobile device 100 by a user command input through the user input interface 150 or an internal program.

The processor 330 may control data transmission of the network interface 135 or the interface 170.

The processor 330 may control the operation of the DEMUX 310, the video processor 320 and the OSD generator 340 of the controller 180.

The OSD generator 340 generates an OSD signal autonomously or according to user input. For example, the OSD generator 340 may generate signals by which a variety of information is displayed as graphics or text in the projected image output from the image projection module 159 or in the image output on the display 151, according to user input signals. The OSD signal may include a variety of data such as a User Interface (UI), a variety of menus, widgets, icons, etc. In addition, the OSD signal may include a 2D object and/or a 3D object.

The OSD generator 340 may generate a pointer which can be displayed on the image projection module 159 or the display 151 according to a pointing signal received from the remote controller (not shown). In particular, such a pointer may be generated by a pointing signal processor and the OSD generator 340 may include such a pointing signal processor (not shown). Alternatively, the pointing signal processor (not shown) may be provided separately from the OSD generator 340.

The mixer 345 may mix the decoded video signal processed by the video processor 320 with the OSD signal generated by the OSD generator 340. The mixed video signal is provided to the FRC 350.

The FRC 350 may change the frame rate of an input image. The FRC 350 may maintain the frame rate of the input image without frame rate conversion.

The formatter 360 may arrange 3D images subjected to frame rate conversion.

The formatter 360 may receive the signal mixed by the mixer 345, that is, the OSD signal and the decoded video signal, and change the format of the signal to suit the image projection module 159 or the display 151, and outputs the signal with the changed format. For example, the formatter 360 may output an RGB data signal. The RGB data signal may be output as a low voltage differential signal (LVDS) or a mini-LVDS.

The formatter 360 may split a 2D video signal and a 3D video signal, for 3D video display. The formatter 360 may change the format of a 3D video signal or convert a 2D video signal into a 3D video signal.

The audio processor (not shown) of the controller 180 may process the demultiplexed audio signal. For audio signal processing, the audio processor (not shown) may have various decoders.

The audio processor of the controller 180 may also adjust the bass, treble or volume of the audio signal.

The data processor (not shown) of the controller 180 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

Although the formatter 360 performs 3D processing after the signals from the OSD generator 340 and the video processor 320 are mixed by the mixer 345 in FIG. 6, the present invention is not limited thereto and the mixer may be located at a next stage of the formatter. That is, the formatter 360 may perform 3D processing with respect to the output of the video processor 320, the OSD generator 340 may generate the OSD signal and perform 3D processing with respect to the OSD signal, and then the mixer 345 may mix the respective 3D signals.

The block diagram of the controller 180 shown in FIG. 6 is exemplary. The components of the block diagrams may be integrated or omitted, or a new component may be added according to the specifications of the controller 180.

In particular, the FRC 350 and the formatter 360 may be included separately from the controller 180.

Figure 7:
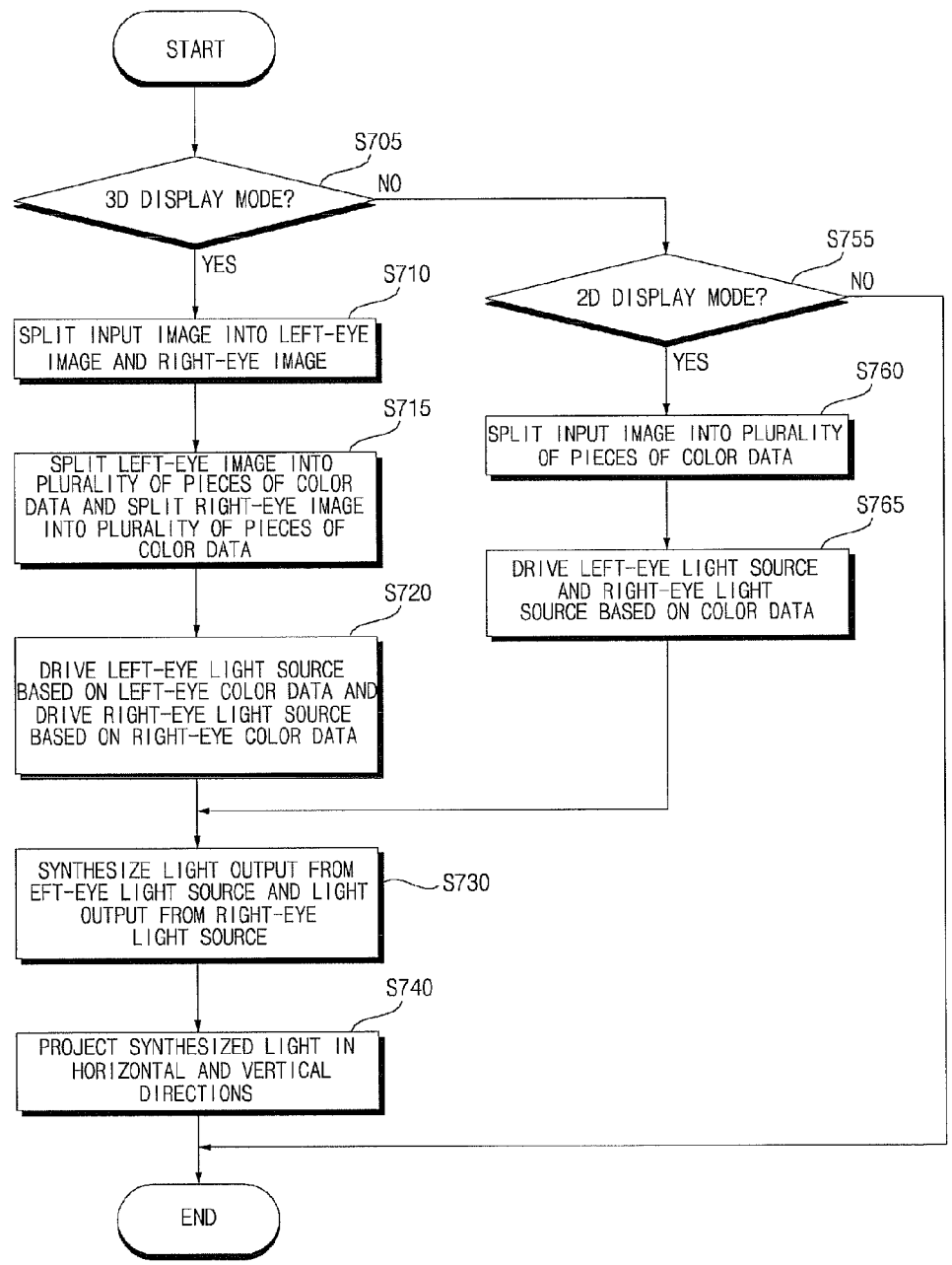
FIG. 7 is a flowchart illustrating a method for operating a mobile device according to an embodiment of the present invention.

FIG. 7 is a flowchart illustrating a method for operating a mobile device according to an embodiment of the present invention, and FIGS. 8 to 12 are views referred to for describing various examples of the method for operating the mobile device of FIG. 17.

Referring to the figure, first, the controller 180 of the mobile device determines whether a 3D display mode is set (S705). If so, an input image is split into a left-eye image and a right-eye image (S710). The left-eye image is split into a plurality of pieces of color data and the right-eye image is split into a plurality of pieces of color data (S715).

The controller 180 of the mobile device may switch to a 3D display mode if an image set or input by a user is a 3D image. The controller 180 and, more particularly, the formatter 360 of the controller 180 may split the input image into the left-eye image and the right-eye image.

For example, the controller 180 and, more particularly, the formatter 360 of the controller 180 may split the 3D image into a left-eye image and a right-eye image if the input image is a 3D image.

For example, if the input image is a 2D image, the controller 180 and, more particularly, the formatter 360 of the controller 180 may split objects using an edge detection method, etc., allocate depths to the objects, and split the 2D image into a left-eye image and a right-eye image.

The controller 180 may split left-eye image data and right-eye image data, for 3D image output. Alternatively, the controller 180 may split a plurality of pieces of color (e.g., blue, green and red) data corresponding to the left-eye image data and split a plurality of pieces of color (e.g., blue, green and red) data corresponding to the right-eye image data, for 3D image output.

The plurality of pieces of color data corresponding to each of the left-eye image and the right-eye image may be input to the image projection module 159. In particular, the plurality of pieces of color data corresponding to the left-eye image may be input to the first driving unit 260 and the plurality of pieces of color data corresponding to the right-eye image may be input to the second driving unit 265.

Next, the image projection module 159 drives the left-eye light source based on the left-eye color data and drives the right-eye light source based on the right-eye color data (S720). The light output from the left-eye light source and the light output from the right-eye light source are synthesized (S730). The synthesized light is projected in the vertical direction and the horizontal direction (S740).

First, the left-eye laser driving unit 260 of the image projection module 159 drives the left-eye light source 210 based on the color data of the input left-eye image and the right-eye laser driving unit 265 drives the right-eye light source 215 based on the color data of the input right-eye image.

As described above, the left-eye light source 210 may include a left-eye blue laser diode 210b, a left-eye green laser diode 210g and a left-eye red laser diode 210r. In addition, the right-eye light source 215 may include a right-eye blue laser diode 215b, a right-eye green laser diode 215g and a right-eye red laser diode 215r.

In the embodiment of the present invention, the laser diodes for outputting light having the same color are spaced apart from each other and output light having different wavelengths. The left-eye image and the right-eye image are projected using light having different wavelengths. Thus, crosstalk between the left-eye image and the right-eye image is reduced when the user views the image.

Next, the photosynthetic units 220, 222, 224, 226, 228 and 230 synthesize light output from the laser diodes and output the synthesized light toward the scanner 240. The photosynthetic units 220, 222, 224, 226, 228 and 230 may be implemented by a 2D MEMS mirror.

Next, the scanner 240 may receive the light synthesized by the photosynthetic units and projects the light in the horizontal direction and the vertical direction. For example, the scanner 240 projects the synthesized light in the horizontal direction with respect to the first line (horizontal scanning), vertically moves to a second line located under the first line (vertical scanning), and projects the synthesized light in the horizontal direction with respect to the second line (horizontal scanning). In this way, the scanner 240 may project the image to be displayed onto the entire region of the screen 200.

Figure 8:
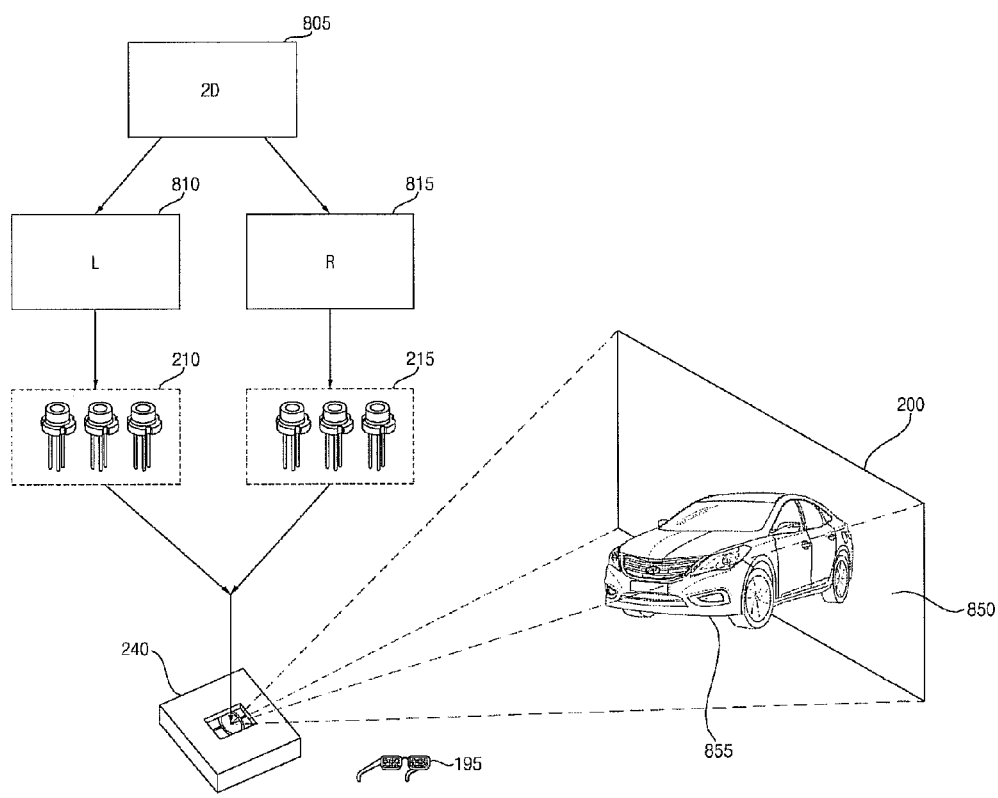
FIGS. 8 to 12 are views referred to for describing various examples of the method for operating the mobile device of FIG. 7.

FIG. 8 shows projection of a 3D image through the image projection module in a 3D display mode. As described above, the controller 180 of the mobile device 100 generates, splits and outputs a left-eye image 810 and a right-eye image 815 if an input image is a 2D image 805.

The left-eye laser driving unit 260 drives the left-eye light source 210 based on the left-eye image data and, more particularly, the color data of the left-eye image. For example, if the luminance of blue light is level 255 among levels 0 to 255, the left-eye laser driving unit 260 may output a signal corresponding to level 255 to the blue laser diode 210*b*.

That is, the left-eye laser driving unit 260 may change the level of the signal input to each laser diode and adjust the luminance of blue light, green light or red light output from the left-eye light source 210.

Similarly, the right-eye laser driving unit 260 drives the right-eye light source 215 based on the right-eye image data and, more particularly, the color data of the right-eye image.

The photosynthetic units 220, 222, 224, 226, 228 and 230 synthesize the blue light, green light and red light output from the left-eye light source 210 and the blue light, green light and red light output from the right-eye light source 215.

The scanner 240 projects the 3D image 850 including a 3D object 855 onto the screen 200 through horizontal scanning and vertical scanning.

The 3D image 850 is projected onto the screen 200 by simultaneously projecting the left-eye projection image corresponding to the left-eye image 810 and the right-eye projection image corresponding to the right-eye image 815.

That is, the scanner 240 simultaneously projects the left-eye projection image and the right-eye projection image without distinction between the left eye and the right-eye upon horizontal scanning and vertical scanning. The left-eye projection image and the right-eye projection image are projected in a synthesized state without being spatially split.

That is, the scanner 240 projects the left-eye projection image and the right-eye projection image without temporal and spatial split in a state of synthesizing light having different wavelengths. Thus, since a spatial splitting method which is a passive method of 3D image display is not performed, the resolution of the projected 3D image may be maintained and, since a temporal splitting method which is an active method of 3D image display is not performed, a vertical synchronization frequency may not be changed.

Figure 9:
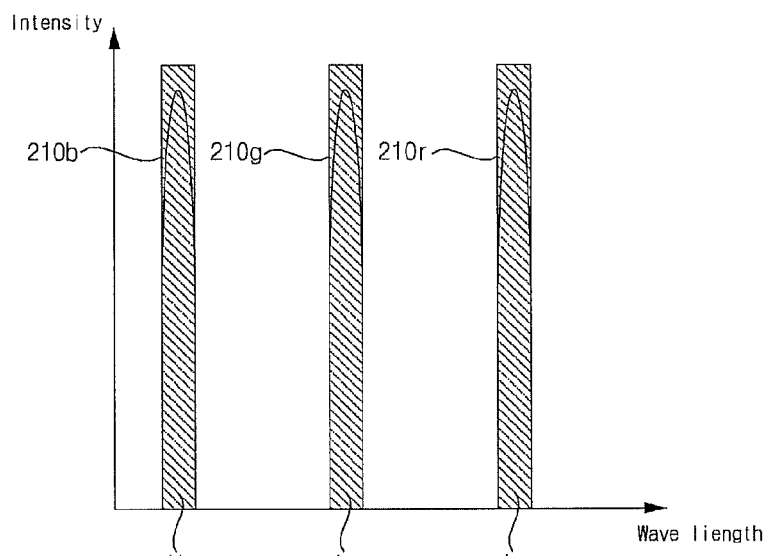
Figure 9:
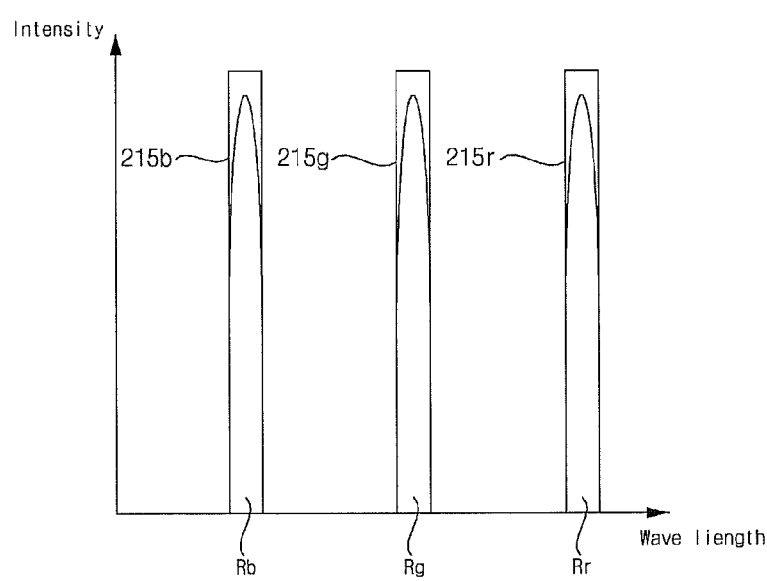

FIG. 9(*a*) shows the wavelength and intensity of blue light 210*b*, green light 210*g* and red light 210*r* corresponding to the left-eye image in the projected 3D image. The left-eye filter 665 on the left-eye glass 660 of the 3D viewing device 195 worn by the user has a blue filter band Lb, a green filter band Lg and a red filter band Lr, which respectively correspond to the wavelength band of blue light 210*b*, green light 210*g* and red light 210*r*. Accordingly, the left eye of the user views only the left-eye image of the projected 3D image.

FIG. 9(*b*) shows the wavelength and intensity of blue light 215*b*, green light 215*g* and red light 215*r* corresponding to the right-eye image in the projected 3D image. The right-eye filter 675 on the right-eye glass 670 of the 3D viewing device 195 worn by the user has a blue filter band Rb, a green filter band Rg and a red filter band Rr, which respectively correspond to the wavelength band of blue light 215*b*, green light 215*g* and red light 215*r*. Accordingly, the right eye of the user views only the right-eye image of the projected 3D image.

If a 3D image is projected onto the screen 200, as shown in FIG. 8, the user may perceive the 3D object 855 having predetermined depth as protruding when wearing the 3D viewing device 195.

The left-eye light source 210 and the right-eye light source 215 have different wavelength bands and thus have different displayable color regions.

Figure 10:
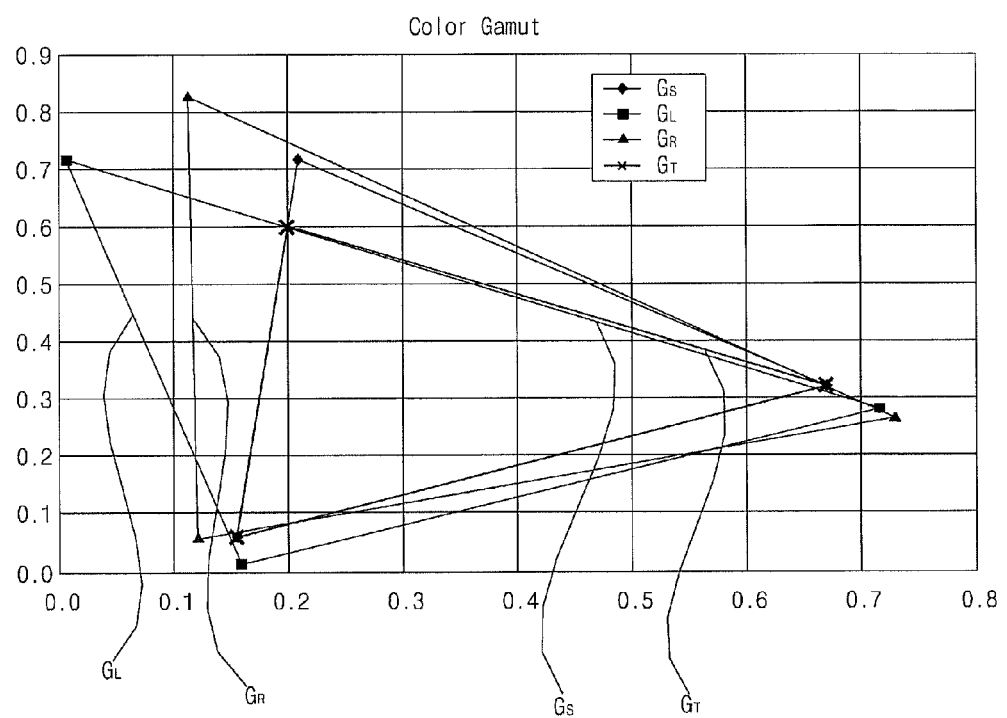

FIG. 10 shows the case in which a left-eye color region $G_L$ corresponding to the left-eye light source 210 and a right-eye color region $G_R$ corresponding to the right-eye light source 215 are different. The left-eye color region $G_L$ corresponding to the left-eye light source 210 having a lower wavelength band is slanted farther toward the left than the right-eye color region $G_R$ on the color gamut graph.

In an additional embodiment of the present invention, upon 3D image projection, a difference between the left-eye color region $G_L$ and the right-eye color region $G_R$ is minimized such that a 3D image suitable for the user with little difference between the left-eye image and the right-eye image is projected.

The common color region of the left-eye color region $G_L$ and the right-eye color region $G_R$ is calculated and the levels of the left-eye color data and the right-eye color data are changed to correspond to the calculated common color region.

Referring to FIG. 10, an NTSC color region $G_S$ is shown. In the embodiment of the present invention, the common color region of the left-eye color region $G_L$ and the right-eye color region $G_R$ is calculated to suit an NTSC criterion.

The common region of the NTSC color region $G_S$, the left-eye color region $G_L$ and the right-eye color region $G_R$ is a common color region $G_T$ as shown.

At least one of the left-eye laser driving unit 260 and the right-eye laser driving unit 265 may output a signal having a changed level to at least one of the left-eye light source 210 and the right-eye light source 215 such that the color region of the light output from the left-eye light source 210 and the color region of the light output from the right-eye light source 215 become equal.

For example, if the left-eye blue data level is 255 and the right-eye blue data level is 255, in order to enable the color region of the light output from the left-eye light source 210 and the color region of the light output from the right-eye light source 215 to become equal, the left-eye laser driving unit 260 decreases the left-eye blue data level by 10 to output a signal corresponding to level 245 to the left-eye light source 210 and decreases the right-eye blue data level by 5 to output a signal corresponding to level 250 to the right-eye light source 215.

Figure 11:
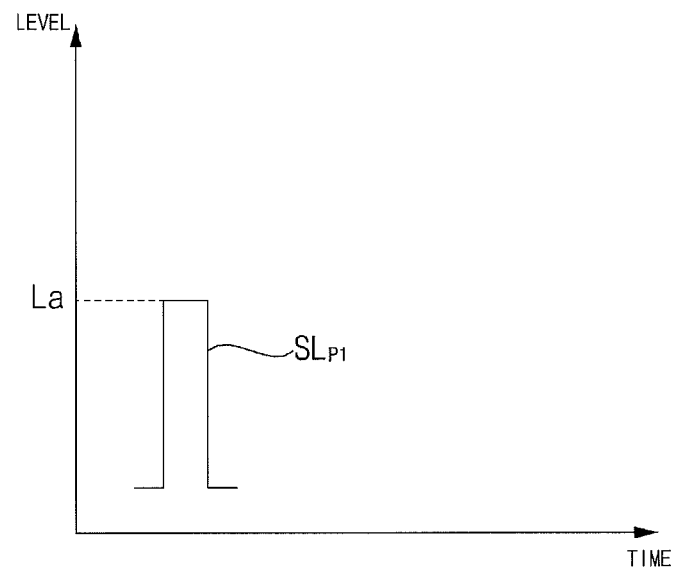
Figure 11:
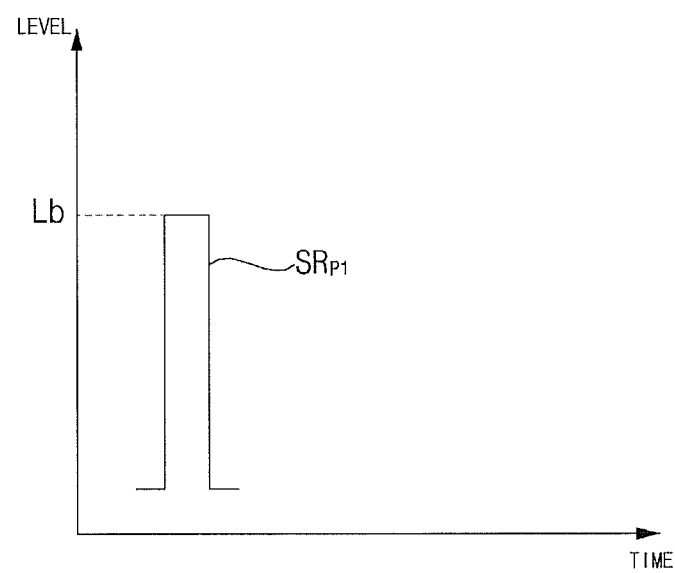

FIG. 11(*a*) shows a data level La of a left-eye color signal $SL_{P1}$ having an adjusted level and FIG. 11(*b*) shows a data level Lb of a right-eye color signal $SR_{P1}$ having an adjusted level. As described above, the data level Lb of the right-eye color signal $SR_{P1}$ is higher than the data level La of the left-eye color signal $SL_{P1}$.

In step 705 (S705), if a 3D display mode is not set, the controller 180 of the mobile device determines whether a 2D display mode is set (S755). If so, an input image is split into a plurality of pieces of color data (S765). Then, steps 703 to 740 (S730 and S740) are performed.

The controller 180 of the mobile device may determine that the 2D display mode is set, if the 3D display mode is not set. Thus, the controller 180 may output an input image or color data corresponding to the input data.

The left-eye laser driving unit 260 and the right-eye laser driving unit 265 of the image projection module 159 drive the left-eye light source 210 and the right-eye light source 215 based on the same color data.

Figure 12:
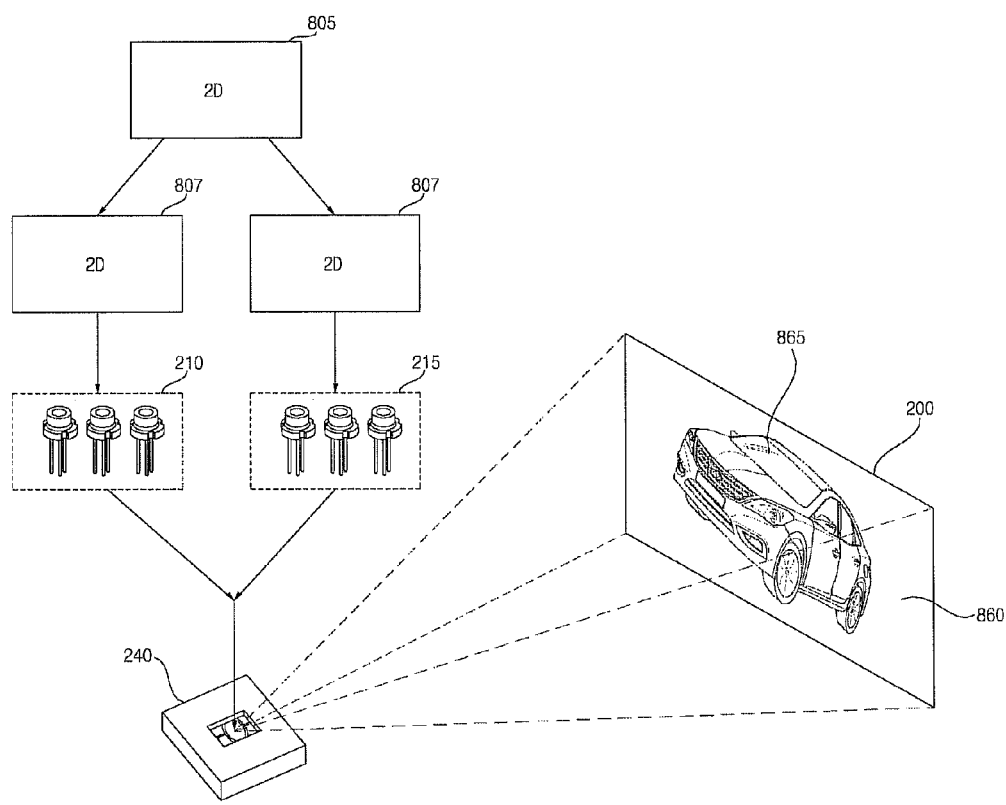

FIG. 12 shows projection of a 2D image by the image projection module in the 2D display mode. As described above, the controller 180 of the mobile terminal 100 may generate a 2D image 807 to be input to the left-eye laser driving unit 260 and the right-eye laser driving unit 265, if the input image is a 2D image 805.

The left-eye laser driving unit 260 and the right-eye laser driving unit 265 drive the left-eye light source 210 and the right-eye laser driving unit 215 based on the color data of the 2D image.

The photosynthetic units 220, 222, 224, 226, 228 and 230 synthesize blue light, green light and red light output from the left-eye light source 210 and blue light, green light and red light output from the right-eye light source 215 and output the synthesized light.

The scanner 240 projects the 2D image 860 including a 2D object 865 onto the screen 200 through horizontal scanning and vertical scanning.

In a 2D image display mode, the left-eye light source 210 and the right-eye light source 215 are driven to project a 2D image having luminance substantially similar to that of a 3D image. Thus, it is possible to increase user convenience.

The color region of the light output from the left-eye light source 210 and the color region of the light output from the right-eye light source 215 may be different.

Alternatively, similarly to description of FIGS. 10 and 11, signal level adjustment may be performed such that the color region of the light output from the left-eye light source 210 and the color region of the light output from the right-eye light source 215 become equal.

According to the embodiment of the present invention, in a 3D image display mode, a mobile device including an image projection module drives left-eye and right-eye light sources for outputting light having different wavelengths based on a left-eye image and a right-eye image, synthesizes light output from the left-eye light source and light output from the right-eye light source, and projects the synthesized light in a first direction and then a second direction. Thus, it is possible to conveniently display a 3D image.

In particular, since the wavelengths of the projected left-eye and right-eye images are different from each other, crosstalk is not generated when a user views a 3D image.

In the 3D display mode, the color region of the light output from the left-eye light source and the color region of the light output from the right-eye light source are different, the level of the signal applied to at least one of the left-eye light source and the right-eye light source is changed so as to project a 3D image suitable for the user with little difference between the left-eye image and the right-eye image.

In a 2D image display mode, the left-eye laser driving unit and the right-eye laser driving unit split the same image data into a plurality of pieces of color data and drive the left-eye light source and the right-eye light source so as to project a 2D image having luminance substantially similar to that of a 3D image. Thus, it is possible to increase user convenience.

The image device including the image projection module according to the present invention is not restricted to the embodiments set forth herein. Therefore, variations and combinations of the exemplary embodiments set forth herein may fall within the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating a mobile device including an image projection module, the method comprising:
    splitting an input image into a left-eye image and a right-eye image in a three-dimensional (3D) image display mode;
    driving left-eye and right-eye light sources for outputting light having different wavelengths based on the left-eye image and the right-eye image;
    synthesizing light output from the left-eye light source and light output from the right-eye light source;
    projecting the synthesized light in a first direction and then a second direction, and
    performing signal processing such that a color region of the light output from the left-eye light source and a color region of the light output from the right-eye light source become equal, in the 3D image display mode,
    wherein the wavelength band of light output from the left-eye light source is separated from the wavelength band of light output from the right-eye light source,
    wherein the wavelength of the light output from the left-eye light source is shorter than the wavelength of the light output from the right-eye light source, and
    wherein a signal level of a right-eye color signal applied to the right-eye light source is higher than a signal level of a left-eye color signal applied to the left-eye light source.

2. The method according to claim 1, further comprising splitting the left-eye image into a plurality of pieces of left-eye color data and splitting the right-eye image into a plurality of pieces of right-eye color data,
    wherein the driving the light sources includes driving the left-eye light source based on the left-eye color data and driving the right-eye light source based on the right-eye color data.

3. The method according to claim 1, wherein the projecting the synthesized light includes simultaneously projecting light corresponding to the left-eye image and light corresponding to the right-eye image.

4. The method according to claim 1, wherein the performing signal processing includes decreasing a level of a signal applied to a light source for outputting light having the smaller wavelength between the left-eye light source and the right-eye light source such that the color region of the light output from the left-eye light source and the color region of the light output from the right-eye light source become equal.

5. The method according to claim 1, further comprising:
    splitting the input image into a plurality of pieces of color data in a two-dimensional (2D) image display mode; and
    driving the left-eye light source and the right-eye light source based on the color data.

6. The method according to claim 5, wherein the color region of the light output from the left-eye light source and the color region of the light output from the right-eye light source are different in the 2D image display mode.

7. The method according to claim 1, wherein the signal level is a data level.

8. The method according to claim 1, wherein performing the signal processing includes adjusting the signal level of the right-eye color signal and adjusting the signal level of the left-eye color signal.

9. An image projection module comprising:
    left-eye and right-eye light sources configured to output light having different wavelengths;
    a photosynthetic unit configured to synthesize light output from the left-eye light source and light output from the right-eye light source;

a scanner configured to project the synthesized light in a first direction and then a second direction, a left-eye laser driving unit configured to split input image data into a plurality of pieces of left-eye color data and to drive the left-eye light source;

a right-eye laser driving unit configured to split input image data into a plurality of pieces of right-eye color data and to drive the right-eye light source; and a scanner driving unit configured to control the first direction scanning and the second direction scanning of the scanner, wherein a color region of the light output from the left-eye light source and a color region of the light output from the right-eye light source is equal, in the 3D image display mode, wherein the wavelength band of light output from the left-eye light source is separated from the wavelength band of light output from the right-eye light source, wherein the wavelength of the light output from the left-eye light source is shorter than the wavelength of the light output from the right-eye light source, and wherein a signal level of a right-eye color signal applied to the right-eye light source is higher than a signal level of a left-eye color signal applied to the left-eye light source.

10. The image projection module according to claim 9, wherein each of the left-eye light source and the right-eye light source includes red, green and blue laser diodes.

11. The image projection module according to claim 9, wherein, in a three-dimensional (3D) image display mode, the left-eye light source outputs light corresponding to a left-eye image, the right-eye light source outputs light corresponding to a right-eye image, and the scanner simultaneously outputs the light corresponding to the left-eye image and the light corresponding to the right-eye image.

12. The image projection module according to claim 9, wherein, in a three-dimensional (3D) image display mode, at least one of the left-eye laser driving unit and the right-eye laser driving unit outputs a signal having a changed level to at least one of the left-eye light source and the right-eye light source such that a color region of light output from the left-eye light source and a color region of light output from the right-eye light source become equal.

13. The image projection module according to claim 9, wherein, in a two-dimensional (2D) image display mode, the left-eye laser driving unit and the right-eye laser driving unit split the same image data into a plurality of pieces of color data and respectively drive the left-eye light source and the right-eye light source.

14. The image projection module according to claim 13, wherein, in the 2D image display mode, the color region of the light output from the left-eye light source and the color region of the light output from the right-eye light source are different.

15. The image projection module according to claim 9, wherein the signal level is a data level.

16. A mobile device comprising:

a controller configured to split an input image into a left-eye image and a right-eye image and to output the left-eye image and the right-eye image; and an image projection module including left-eye and right-eye light sources configured to output light having different wavelengths, a photosynthetic unit configured to synthesize light output from the left-eye light source and light output from the right-eye light source and a scanner configured to project the synthesized light in a first direction and then a second direction, wherein the image projection module further includes:

a left-eye laser driving unit configured to split input image data into a plurality of pieces of color data and to drive the left-eye light source;

a right-eye laser driving unit configured to split input image data into a plurality of pieces of color data and to drive the right-eye light source; and a scanner driving unit configured to control the first direction scanning and the second direction scanning of the scanner, wherein a color region of the light output from the left-eye light source and a color region of the light output from the right-eye light source is equal, in the 3D image display mode, wherein the wavelength band of light output from the left-eye light source is separated from the wavelength band of light output from right-eye light sources, wherein the wavelength of the light output from the left-eye light source is shorter than the wavelength of the light output from the right-eye light source, and wherein a signal level of a right-eye color signal applied to the right-eye light source is higher than a signal level of a left-eye color signal applied to the left-eye light source.

17. The image projection module according to claim 9, wherein the signal level of the right-eye color signal applied to the right-eye light source is adjusted and the signal level of the left-eye color signal applied to the left-eye light source is adjusted.

18. The mobile device according to claim 16, wherein the signal level is a data level.

19. The mobile device according to claim 16, wherein the controller outputs the same image data to the left-eye laser driving unit and the right-eye laser driving unit.

20. The mobile device according to claim 16, wherein the signal level of the right-eye color signal applied to the right-eye light source is adjusted and the signal level of the left-eye color signal applied to the left-eye light source is adjusted.

* * * * *